United States Patent Office 2,712,767
Patented July 12, 1955

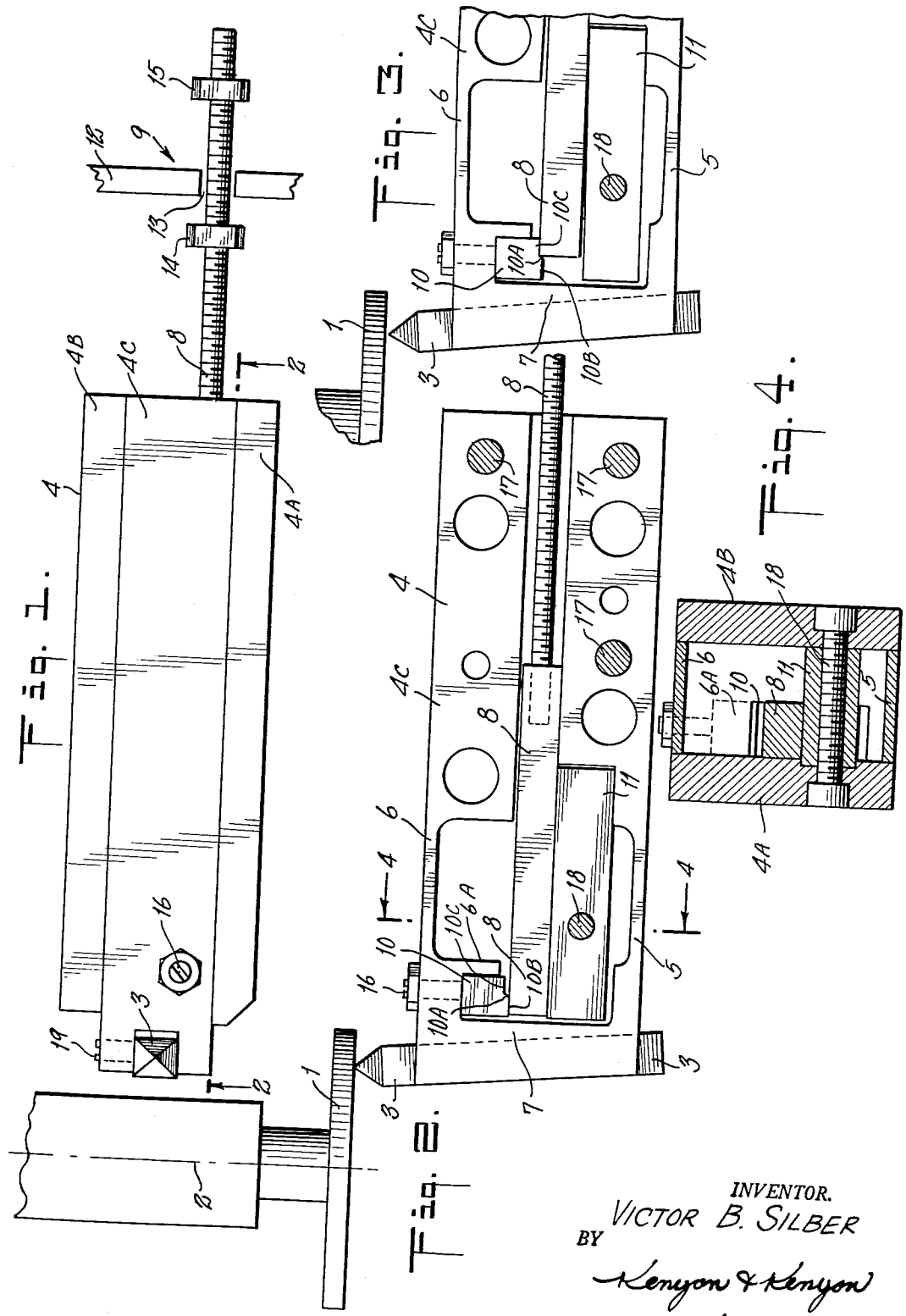

2,712,767

MECHANISMS FOR AUTOMATICALLY RELIEVING CUTTER TOOLS FROM WORK SURFACES

Victor B. Silber, Woodmere, N. Y.

Application July 24, 1952, Serial No. 300,677

5 Claims. (Cl. 82—24)

In mechanisms, such as automatic lathes, in which a cutting tool reciprocates repeatedly over the face of a work piece to cut or "face" the same on its forward stroke, one troublesome problem has been that of avoiding scratching of the worked face by the tool on its reverse stroke, i. e., when it is returning to the starting point of the cut. The cause is a small amount of springiness or resilience in the cutter which holds it against the work even after the cut is finished. Mechanisms are available which solve this problem by positively withdrawing ("relieving") the cutting tool from the worked surface during the reverse stroke, but they have generally been unduly complicated by an excessive number of parts which not only increase cost, but also present situations in which wear can occur too easily. Wear can cause such troubles as chatter (vibration). For example, many include journals at which wear or bad fitting may occur, and that can only be obviated by costly replacement in the case of wear, and costly precision manufacture in the case of bad fittings. Also, many such constructions are complicated by the presence of special spring elements.

The present invention solves the problem with considerable simplicity. A minimum number of parts are required; journals and springs are eliminated; and the cost by comparison with presently available mechanisms is considerably reduced. At the same time a rugged and completely effective mechanism is provided.

The essentials of the invention will best be understood by reference to the illustrative embodiment shown in the annexed drawing and described in the following specification.

In the drawings:

Fig. 1 is a top view;

Fig. 2 is a section along the line 2—2 of Fig. 1 showing the cutter tool in cutting position;

Fig. 3 is a view similar to Fig. 2 showing the tool in withdrawn or relieved position;

Fig. 4 is a section along the line 4—4 of Fig. 2.

Referring to the Fig. 2 the mechanism is illustrated as though cutting or "facing" the end surface of a cylindrical work piece 1 which is being rotated on a suitable spindle about the axis 2. The cutting is accomplished by the cutter tool 3 during the forward (leftward) stroke of its reciprocatory motion from the periphery to the axis of the work piece 1. The cutter tool 3 is slightly withdrawn from the surface of the work piece 1 during the reverse stroke, i. e., when moving from the axis back to the periphery so that it may initiate another forward cutting stroke of the reciprocatory cycle. The mounting for the cutter tool 3 is as follows:

The cutter tool 3 is affixed to the tool carriage or holder 4 which is reciprocable with respect to work piece 1 and wall 12. Numerous means for causing that reciprocatory motion of the holder 4 are known to the art and are, therefore, not described in detail. The objects of the invention are accomplished by bending an outer end portion of this holder 4 toward the work piece 1 during the cutting motion or forward stroke. To that end, the holder 4 is constructed so that its end portion which holds cutter 3 may be so bent. For example, the holder may be formed of two rigid side plates 4A and 4B, and a center plate 4C at least the outer end of which is flexible (and holding cutter 3). This outer end of plate 4C is constructed somewhat in the form of the hollow yoke formed of the side arms 5 and 6 interconnected by the cross arm 7 at the outer end. The side arms 5 and 6 are thin enough to lend sufficient elasticity or flexibility to the structure to permit it to be elastically bent toward the work piece 1 during the forward cutting stroke and to be withdrawn therefrom at the end of that stroke.

In order that the foregoing structure of plate 4C with the cutting tool 3 may be bent automatically toward the work piece 1 during the forward stroke and automatically retracted ("relieved") therefrom during the reverse stroke, the following means are provided. A reciprocable actuator or follower rod 8 is so mounted that it can be reciprocated by the holder 4 with a small amount of lost motion between the holder 4 and the rod 8. That is to say, rod 8 moves forward and backward with the holder 4 except for a short period during which it is at rest by virtue of the lost motion mechanism 9 as presently to be described. During that period it slides in a suitable longitudinal channel in plate 4C. Carried by the holder 4 is a wedge 10 loosely arranged in a pocket formed by tongue 6A depending from arm 6. Wedge 10 is so arranged that the motion of the holder 4 will force the wedge tightly between the rod 8 and the arm 6 at the extreme end of the reverse stroke, and withdraw it therefrom at the extreme end of the forward stroke. The rod 8 is backed up by a rigid back stop or fixed member 11 fixedly bolted to and between side plates 4A and 4B. Thereby, rod 8 does not itself bend during this wedging action but remains fixed relative to plates 4A and 4B. Instead when the wedge 10 is forced in between the arm 6 and the rod 8, the arms 5 and 6 will be bent toward the work piece 1.

The lost motion mechanism 9 comprises a fixed wall 12 with an aperture 13 through it of sufficient size to permit the free movement of the rod 8 but of small enough size to prevent the nuts 14 and 15 from passing through the aperture. The nuts 14 and 15 are threadedly fixed to the rod 8, although they may be moved one way or another along its length by rotation.

The operation of the described mechanism is as follows: Assuming that the cutter tool 3 is to undergo a reciprocatory motion equal to the diameter of the work piece 1, the nuts 14 and 15 will be spaced that distance apart and at such positions longitudinally of rod 8 that the following action occurs. As the holder 4 reaches the extreme end of its reverse stroke (to the right) nut 14 will engage the wall 12 and thus prevent any further movement of the rod 8 to the right. Further slight movement of the holder 4 to the right will force the wedge 10 firmly between the arms 6 and the rod 8 so as to bend the outer end structure of the holder 4 toward the work piece 1 and thereby bring the cutter tool 3 into engagement with the work piece. That is to say, the tip of rod 8 rides up inclined surface 10A of wedge 10 to its upper level 10B (as shown in Fig. 2). The forward stroke will then commence, the cutter tool 3 moving with the holder 4 toward the axis of the work piece 1, and the rod 8 following along by virtue of its frictional engagement with the wedge 10. However, when the cutting tool 3 reaches the axis of the work, the nut 15 will contact the wall 12 and thereby prohibit any further movement of the rod 8 to the left. A slight further movement of the holder 4 and the cutter to the left will withdraw the wedge from its engagement between rod 8 and arm 6.

That is, the tip of rod 8 will ride down inclined surface 10A to lower level 10C of wedge 10 (Fig. 3). This permits the bent portions (arms 5 and 6) of the plate 4C elastically to restore themselves to an unstrained position and thereby withdraw the cutter 3 from the surface of the work piece 1. This bending movement may, of course, be very small since it is necessary only to lift the cutting tool a very slight distance away from the work surface to prevent scratching during the reverse stroke. The amount of the bending may be controlled by the thread screw 16 which pushes the wedge 10 toward the rod 8. The amount can also be controlled by the pitch of the inclined surface 10A of the wedge facing the rod 8. That pitch is exaggerated in the drawing only for clarity of exposition.

Side plates 4A and 4B, and the right end of center plate 4C may be bolted rigidly together by bolts 17 so long as the left end of plate 4C is free to bend with respect to plates 4A and 4B, as described. Bolt 18 holds the side plates 4A and 4B, as well as member 11 rigidly together. Screw 19 holds cutter 3 removable in holder 4.

I claim:

1. A mechanism for advancing a cutting tool against a work piece and holding it there during repeated forward strokes of reciprocatory motion across a work surface and withdrawing the tool from the work piece during the reverse stroke across the work surface comprising a reciprocatable tool holder, a follower rod adapted to be reciprocated by the tool holder in lost motion relation thereto, a fixed member and a lost motion connection between the fixed member and follower rod, the tool holder including two rigid side plates and an intermediate flexible center plate therebetween, the side plates and one end of the center plate being rigidly affixed together so that the other end of the center plate may be bent toward the work piece, a wedge positioned to be wedged by the reverse stroke motion of the holder, between the follower rod and the said other end of the center plate at the end of the holder's reverse stroke and to be withdrawn therefrom by the forward stroke motion of the holder at the end of its forward stroke whereby the said other end of the center plate is elastically bent toward the work during the forward stroke and elastically withdrawn therefrom during the reverse stroke.

2. A mechanism as in claim 1 in which the said other end of the center plate comprises two flexible arms extending from the one end fixed between the side plates and a cross arm interconnecting the outer ends of the flexible arms.

3. A mechanism as in claim 2 in which the follower rod slides within a channel in the center plate so that its end is between the flexible arms, and the wedge is positioned between the follower rod and one of the flexible arms.

4. A mechanism as in claim 3 in which the lost motion connection between the fixed member and follower rod comprises a hole in the fixed member through which the follower rod extends, and stop nuts threaded on the follower rod on each side of the hole of size larger than the hole.

5. A mechanism for automatically relieving a tool from a work surface, the mechanism including two side plates which are substantially rigid with respect to transverse edgewise flexure and a center plate having an outer end portion which is elastically flexible in a transverse edgewise direction and means for mounting a tool on said portion, all of the plates being superimposed and having means for fastening them together so that they are mutually rigid with respect to relative transverse edgewise motion at a location spaced backwardly from said end portion, the latter being free to flex transversely edgewise with respect to the side plates and having an opening formed transversely therethrough and a passage which extends backwardly from this opening to the back end of the center plate, a support connected to and supported by the side plates and extending transversely therebetween through said opening, a reciprocative actuator sliding in said passage and having an end projecting backwardly therefrom, for connection to an operating means, and means interconnecting said actuator, support and end portion for camming the support and end portion apart so as to flex and relieve the latter when the actuator is reciprocated.

References Cited in the file of this patent

UNITED STATES PATENTS

| 1,775,963 | McCarroll | Sept. 16, 1930 |
| 2,326,922 | Bieler | Aug. 17, 1943 |
| 2,396,631 | Andersen | Mar. 19, 1944 |
| 2,441,533 | Montgomery | May 11, 1948 |
| 2,445,013 | Winkler | July 13, 1948 |
| 2,482,786 | Mack | Sept. 27, 1949 |
| 2,533,254 | Whigam | Dec. 12, 1950 |

FOREIGN PATENTS

| 80,426 | Switzerland | Mar. 1, 1919 |